Figure 1:
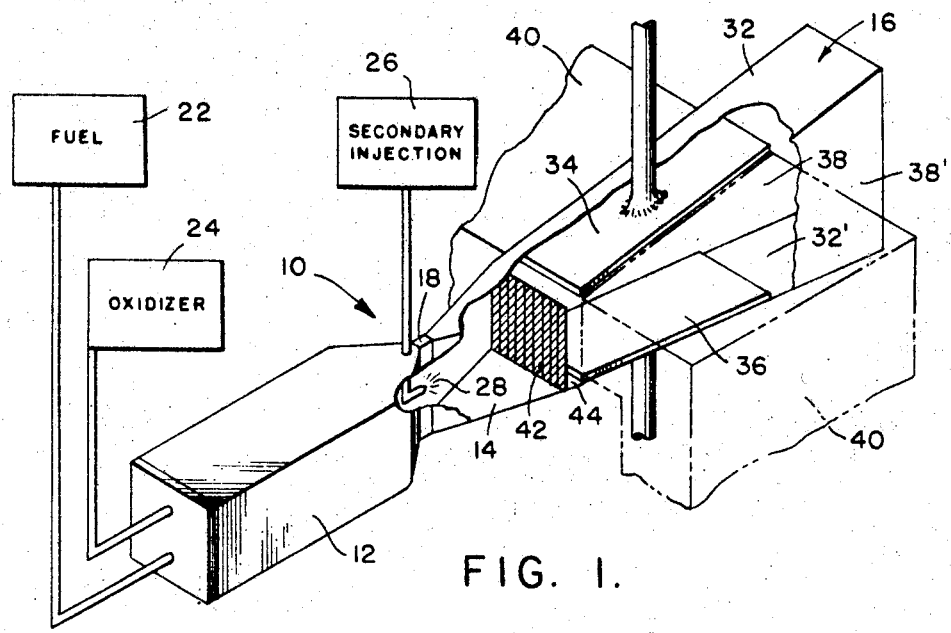

Feb. 6, 1968     L. J. KRZYCKI ETAL     3,368,088
STANDING-DETONATION WAVE MAGNETOHYDRODYNAMIC
ELECTRICAL GENERATOR
Filed Sept. 20, 1963

INVENTORS.
LEROY J. KRZYCKI
CLINTON L. SPINDLER
BY
P. H. Firsht
ATTORNEY.

United States Patent Office 3,368,088
Patented Feb. 6, 1968

3,368,088
STANDING-DETONATION WAVE MAGNETOHY-
DRODYNAMIC ELECTRICAL GENERATOR
Leroy J. Krzycki and Clinton L. Spindler, China Lake,
Calif., assignors to the United States of America as represented by the Secretary of the Navy
Filed Sept. 20, 1963, Ser. No. 310,509
8 Claims. (Cl. 310—11)

The invention herein described may be manufactured and used by or for the Government of the United States of America for governmental purposes without the payment of any royalties thereon or therefor.

The present invention relates to electrical power generation, and more particularly to a magnetohydrodynamic (MHD) electrical power generator which generates electrical power by passing an ionized gas through a strong magnetic field and which employs a standing detonation wave combustion system to provide the ionized gas.

The principle of electrical power generation of the MHD generator is the same as that of the conventional rotating mechanical generator, namely; a conductor cutting magnetic lines of flux generates an electromotive force. In the mechanical generator an external power source causes a metallic conductor to rotate in a magnetic field; in the MHD generator the metallic conductor is replaced by an ionized gas that is caused to flow between electrodes through a power channel subjected to a strong magnetic field which is perpendicular to the gas stream and parallel to the electrodes. The electrodes are in contact with the gas and draw power from the gas flow, which results in a reduction in enthalpy. In most cases the source of the hot ionized gas has been a conventional liquid or gaseous fuel combustion chamber which is operated at one to three atmospheres of pressure with the entrance Mach number of the power channel less than one, the hot gas usually being "seeded" with a material of low ionization potential (for example, the alkali metals or their salts) to provide a sufficient number of ions in the gas stream to obtain sufficiently high values of electrical conductivity for the generation of electrical power.

While, as stated in the article entitled "The prospects of MHD power generation" by Leo Steg and George W. Sutton in Astronautics, vol. 5, No. 8 (August 1960), MHD power generation appears to have some advantages over more conventional electrical power generating techniques, it is not without its problems, chief among which are losses, gaseous conductivity and the lasting properties of materials at high temperatures.

End losses occur because the gas ahead and behind the power extraction is ionized. This provides a shunt path for the current which reduces the amount of power that can be extracted from the gas stream. Wall losses are associated with insulators which become conductors when required to operate at extremely high temperatures (3,000–4,000° K.) for considerable periods of time. Heat losses are usually quite high because the materials of which the combustion chamber and channel are made are exposed to high temperatures for extensive lengths of time. If these materials are cooled to permit them to operate at the high temperatures then a considerable portion of the gas stream energy goes into the cooling medium and only a small amount is actually converted into electrical power. Moreover, as the gas stream temperature is decreased at a given pressure the conductivity of the gas also decreases; this reduces the electrical power generating capacity of the channel.

The problem of gas conductivity or ionization is one of diminishing returns. The normal practice in MHD power generaton is to "seed" the combustion gases with a material of low ionization potential; the greater the percentage of total mass flow which is "seed" material the greater will be the gas conductivity. However, when too much "seed" material is added to the gas stream the flame temperature of the combustibles is lowered and the conductivity decreases. Therefore, an optimum level of "seed" is reached which limits the maximum conductivity which the gas in the power channel may attain.

The problem of materials has already been touched upon in the discussion of losses and gas conductivity. For good ionization the gas must be extremely hot. If the power density, that is, the generated power per unit of channel volume, is not to decrease as the gas flows through the channel then the ionization level must remain essentially constant throughout the channel. The side walls of the channel through which the magnetic field passes must be insulators; usual materials are ceramic slabs, for example, boron nitride or magnesium oxide, backed by water-cooled stainless steel. Electrode materials are usually graphite, or thoriated tungsten if a thermionic emitter is required, or water-cooled copper if a field emitter is desired.

The present invention overcomes many of the attendant problems of prior MHD power generators by employing a standing detonation wave to hold losses to a minimum and to supply a hot ionized gas without exceeding the limitations of present-day materials.

It is therefore an object of the present invention to provide a source of highly ionized gas for use in MHD power generation.

Another object is the provision of an MHD power generator in which losses are held to a minimum and a hot ionized gas is provided without exceeding the limitations of present-day materials.

A further object is to provide an MHD power generator which employs a standing detonation wave combustion system to provide a hot ionized gas.

Figure 2:
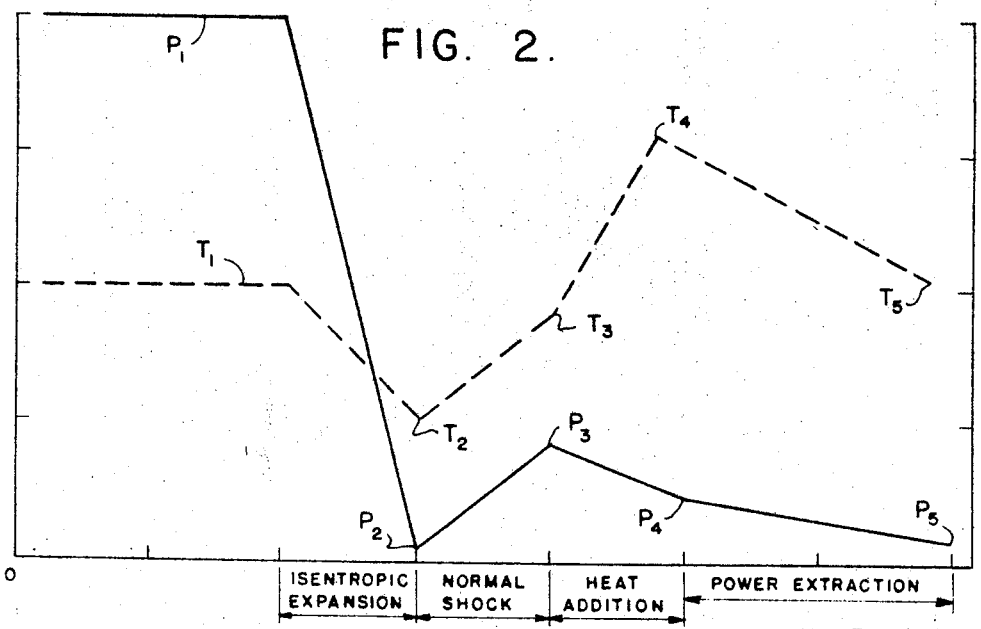

Other objects, advantages and novel features of the invention will become apparent from the following detailed description of the invention when considered in conjunction with the accompanying drawing wherein:

FIG. 1 is perspective view schematically illustrating the MHD power generation of the present invention with parts broken away to show the interior of the generator; and FIG. 2 is a graphic representation of the operation of the generator.

The present invention is based upon the discovery that the gas downstream from a standing detonation wave is highly ionized. A detonation wave may be considered as an aerodynamic shock wave followed by heat addition due to chemical action. As will be appreciated from reading of articles such as "Considerations for the Attainment of a Standing Detonation Wave" by J. Rutkowski and J. A. Nicholls, Proceedings, Gas Dynamics Symposum on Aerothermochemistry, Northwestern University, 1956; "Studies in Connection with Stabilized Gaseous Detonation Waves" by J. A. Nicholls, E. K. Dabora and R. L. Gealer, Seventh Symposium (International) on Combustion, Butterworths Scientific Publications, London, 1959; "A Study of Supersonic Combustion" by Robert A. Gross and Wallace Chinitz, Journal of the Aero/Space Sciences, volume 27, 1960; and other literature on the subject, attainment of a standing detonation wave is dependent upon the type of fuel and oxidant employed, the physical characteristics of the combustion device, the concentration of the combustible materials in the device, and the gas dynamics of the flow process. Accordingly, the present invention will be described only in general terms.

Referring now to the drawings, wherein like reference characters designate like or corresponding parts throughout the several views, there is shown in FIG. 1 a perspective view of an embodiment of an MHD power generator in accordance with the present invention, the generator being designated generally by reference numeral 10. The generator 10 comprises a primary chamber 12, a secondary chamber 14, and a power channel or duct 16, the chambers 12 and 14 being interconnected by a throat portion 18 to form a deLaval nozzle.

Suitably connected to the chamber 12 for burning therein is a supply of fuel 22 and a supply of oxidizer 24. The throat portion 18 is suitably connected to a container 26 adapted to contain fuel or oxidizer, as necessary, for reasons hereinafter appearing, which is injected into the generator at or before the throat portion 18, as at 28, and provides for secondary injection of combustion material.

The power channel or duct 16 is formed with a pair of flaring walls 32, 32' within which are disposed a pair of electrodes 34, 36 adapted to contact the gas stream flowing through the duct. The duct 16 is also formed with a pair of parallel walls 38, 38' through which a strong magnetic field of flux passes perpendicularly as, for example, the magnetic field of an electromagnet 40 (shown in part) or the like.

Several events occur in chamber 14 as will become apparent from a description of the operation of the invention in conjunction with the showings of FIGS. 1 and 2. Fuel and oxidizer from containers 22 and 24 are injected into primary chamber 12 in nonstoichiometric mixture ratio, preferably oxidizer-rich, and combusted therein to provide a gas mixture having a subsonic velocity. Fuel from container 26 (or oxidizer if the primary mixture is fuel-rich) is injected into the generator at a point, 28, in or before the throat portion 18. The gas mixture resulting after secondary injection is a combustible mixture, at pressure $P_1$ and temperature $T_1$, which is then expanded isentropically and supersonically in secondary chamber 14 to its supersonic detonation velocity, at reduced pressure $P_2$ and temperature $T_2$. The gas mixture then passes through a normal shock to a subsonic velocity, at pressure $P_3$ and temperature $T_3$, detonation occurring across the plane of the normal Mach disk or shock wave front 42 resulting from interacting oblique shock waves, with auto-ignition of the combustible mixture at the plane of the wave front and burning of the mixture in a standing detonation wave zone immediately downstream therefrom, as at 44, which adds heat in a constant area process and produces a working fluid in the form of a low pressure, high temperature, highly ionized gas stream having sonic velocity at pressure $P_4$ and temperature $T_4$. These are the exit conditions of the standing detonation wave combustion system and the entrance conditions of the power generation channel 16. The gas stream flows through the channel to exit at pressure $P_5$ and temperature $T_5$, electrical energy being extracted during flow of the gas stream with a resulting reduction in the stagnation enthalpy of the stream.

Although the power channel has been shown with parallel and flaring walls, it is to be understood that, to suit conditions, the design thereof may be varied and obviously many modifications and variations of the present invention are possible in light of the foregoing teachings. It is therefore to be understood that within the scope of the appended claims the invention may be practiced otherwise than as specifically described.

What is claimed is:

1. A method for generating electrical power comprising the steps of:
    (a) reacting a nonstoichiometric ratio mixture of a plurality of chemically reactive ingredients;
    (b) adding the ingredient necessary to bring the overall mixture ratio up to stoichiometric;
    (c) expanding the stoichiometric mixture;
    (d) reacting the unreacted ingredients; and
    (e) passing the reacted mixture through a magnetic field and in contact with spaced electrodes for extraction of electrical energy from the reacted mixture during its passage through the magnetic field.

2. A method for generating electrical power comprising the steps of:
    (a) providing an amount of heat combusting a plurality of nonstoichiometric mixture of combustible ingredients;
    (b) adding the ingredients necessary to bring the overall mixture ratio up to stoichiometric;
    (c) expanding the stoichiometric mixture;
    (d) providing additional heat by reacting the unreacted ingredients; and
    (e) passing the reacted mixture through a magnetic field and in contact with spaced electrodes for extraction of electrical energy from the reacted mixture during its passage through the magnetic field.

3. A method for generation of electrical power comprising the steps of:
    (a) reacting a nonstoichiometric ratio mixture of a plurality of chemically reactive ingredients;
    (b) passing the reacted nonstoichiometric mixture through a nozzle throat portion and simultaneously adding the ingredient necessary to bring the overall mixture ratio up to stoichiometric;
    (c) expanding the stoichiometric mixture in an expansion chamber;
    (d) causing ignition and reaction of the unreacted ingredients; and
    (e) passing the reacted mixture through a channel between a pair of magnetic poles and in contact with spaced electrodes for extraction of electrical energy from the reacted mixture during its passage through a magnetic field between the pair of poles.

4. A method for generation of electrical power comprising the steps of:
    (a) reacting a nonstoichiometric ratio mixture of fuel and oxidizer ingredients;
    (b) passing the resulting mixture through a nozzle throat portion and simultaneously adding the ingredient necessary to bring the over-all fuel-to-oxidizer ratio up to stoichiometric;
    (c) expanding the stoichiometric mixture in a primary chamber;
    (d) passing the expanded mixture through a shock wave front for ignition of the mixture and reaction of the unreacted ingredients; and
    (e) passing the reacted mixture through a secondary chamber disposed across a magnetic field and in contact with spaced electrodes for extraction of electrical energy from the reacted mixture during its passage through a magnetic field.

5. A method of electrical power generation comprising the steps of:
    (a) introducing fuel and oxidizer ingredients into a combustion chamber with a deficiency of one ingredient to form a nonstoichiometric ratio mixture;
    (b) combusting said mixture in said chamber at a temperature not higher than can be withstood by the materials of which the chamber is made;
    (c) passing said combusted mixture through a nozzle throat portion and thereat simultaneously introducing into the combusted mixture the ingredient necessary to bring the over-all fuel-to-oxidizer ratio up to stoichiometric and provide a detonable mixture;
    (d) expanding said detonable mixture isentropically and supersonically in a primary chamber to a velocity at which auto-ignition of the detonable mixture takes place and a detonation occurs, thereby triggering chemical reaction of the unreacted fuel and oxidizer ingredients at a temperature not higher than can be withstood by the materials of which the chamber is made and thus providing a reacted mixture; and
    (e) passing said reacted mixture through a secondary chamber disposed across a magnetic field and in contact with spaced electrodes for extraction of electrical energy from the reacted mixture during its passage through the magnetic field.

6. A method of electrical power generation comprising the steps of:
  (a) providing an amount of heat by combusting a nonstoichiometric ratio mixture of fuel and oxidizer ingredients;
  (b) passing said combusted mixture through a nozzle throat portion and thereat adding the ingredient necessary to bring the mixture ratio up to stoichiometric;
  (c) expanding said stoichiometric mixture supersonically in a primary chamber to a velocity at which detonation occurs;
  (d) providing additional heat by reacting the unreacted ingredients in a standing detonation wave zone; and
  (e) passing said reacted mixture through a secondary chamber between a pair of magnetic poles and in contact with spaced electrodes for extraction of electrical energy from the reacted mixture during its passage through a magnetic field between the pair of poles.

7. A system for electrical power generation comprising:
  means for combusting a nonstoichiometric ratio mixture of fuel and oxidizer ingredients in a primary zone of burning for providing an amount of heat and generating a gas stream mixture;
  a primary chamber;
  a throat portion communicating said chamber and zone;
  means within said throat portion for introducing one of said ingredients for bringing the gas stream mixture up to stoichiometric ratio and thereby providing a combustible mixture;
  a secondary chamber communicating with said primary chamber;
  spaced-apart oppositely disposed electrodes associated with said secondary chamber; and
  means providing a magnetic field passing through the space between said electrodes.

8. A system of electrical power generation comprising:
  a throat portion through which a gas stream passes;
  means within said throat portion for adding a combustible ingredient to the gas stream;
  a first chamber having divergent walls extending downstream from said throat portion and adapted to expand said gas stream isentropically and supersonically;
  a second chamber extending downstream from said first chamber and adapted to pass said gas stream through a field of magnetic flux;
  a pair of spaced-apart oppositely-facing electrodes within said second chamber adapted to be in contact with said passing gas stream; and
  a pair of magnetic poles adjacent said second chamber providing a field of magnetic flux passing through the space between said electrodes.

References Cited

UNITED STATES PATENTS 3,201,622  8/1965  Thring _____ 310—11

RODNEY D. BENNETT, *Primary Examiner.*

LEWIS H. MYERS, CHESTER L. JUSTUS,
*Examiners.*

J. P. MORRIS, *Assistant Examiner.*